United States Patent Office 2,905,722
Patented Sept. 22, 1959

2,905,722

PREPARATION OF 1,3-ALKADIENE ETHERS

Amelio E. Montagna and Donald H. Hirsh, South Charleston, W. Va., assignors to The Union Carbide Corporation, a corporation of New York No Drawing. Application April 24, 1956
Serial No. 580,172

6 Claims. (Cl. 260—614)

This invention relates to the preparation of 1,3-alkadiene ethers. More particularly, it relates to a liquid phase process for the controlled dealcoholation of an aliphatic triether to a 1,3-alkadiene ether in the presence of an acidic catalyst.

The first reported preparation of alkadiene ethers was by Wichterle (Coll. Czechoslov. Chem. Commun. 10, 479 (1938)) who prepared the 1-alkoxy-1,3-butadiene by the decomposition of 1,1,-dialkoxy-3-chlorobutane by the use of fused potassium hydroxide. In the process, yield of the ethoxy-, propoxy-, butoxy-, and isobutoxy-butadienes was quite low, generally about 10 percent or less. This method was not applicable to the preparation of the methoxy-butadiene. It is also known (Herrmann and Haehnel, German Patent 843,696, (1952)) that 1-alkoxy-1,3-butadiene can be prepared from 1,1,3-trialkoxybutane. This process appears to be applicable to the preparation of methoxy- and ethoxy-butadiene by passing the vapors of the corresponding 1,1,3-trialkoxybutane over a catalyst of barium hydroxide and asbestos powder, at a temperature of about 400° C. Other researchers have reported (Marion and Farmilo, Can. J. Res. 25B, 118–20, 1947 and Farmilo and Nicholls, Can. J. Res. 28B, 689–700, 1950) that similar alkoxybutadienes can be prepared in a vapor-phase reaction over barium oxide-silicon dioxide mixtures at about 300° C., confirming the earlier work of Meier, Ber. 77, 108–110 (1944). Other reported preparations of alkadiene ethers have employed vapor-phase pyrolytic processes with such catalysts as activated alumina, silica gel, and activated carbon. Yields of the alkadiene ethers in such vapor-phase pyrolytic processes have approached 80 percent of theoretical but the processes suffer from the difficulty of the short service life of the catalyst. As such, the vapor phase processes have been unsuitable for commercial applications.

Previous attempts to effect the reaction in a liquid-phase reaction in the presence of catalysts did not result in significant yields of the alkadiene ether. In Meier, Ber. 77, 108–110 (1944) there is disclosed a dealcoholation of 1,1,3-trimethoxybutane to secure a dark brown oil and methanol. No pure 1-methoxy-1,3-butadiene was recovered. To our knowledge, no satisfactory liquid-phase process for the preparation of alkadiene ethers from aliphatic triethers has been reported.

We have now discovered that 1,3-alkadiene ethers can be efficiently produced in yields up to nearly 100 percent of theoretical in a liquid-phase dealcoholation of an aliphatic triether in the presence of an acid-acting catalyst, according to the following scheme:

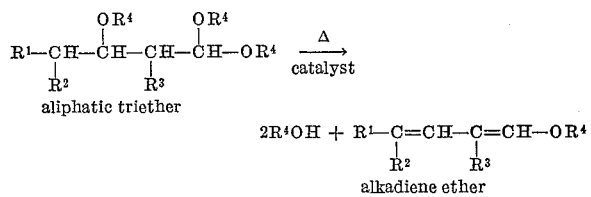

Our process is applicable to the production of alkadiene ethers as set forth in the above formula wherein $R^1$, $R^2$, and $R^3$ are hydrogen or lower alkyl groups, such as those having from 1 to about 6, inclusive, carbon atoms, and $R^4$ is an aliphatic group containing from 1 to about 10, inclusive carbon atoms. $R^1$, $R^2$, and $R^3$ can be the same or different.

The preferred alkadiene ethers are those where the sum of the carbon atoms of the $R^1$, $R^2$, $R^3$, and $R^4$ groups is less than 13. According to our experience, the $R^4$ group can be an aliphatic or substituted aliphatic group, such as an alkyl, alkoxyalkyl, alkoxyalkoxyalkyl, aralkyl, aryloxyalkyl, or an alkenyl group, containing up to about 10 carbon atoms. Preferably the $R^4$ group is an aliphatic hydrocarbon or oxyhydrocarbon group containing between about one and eight carbon atoms and not more than two oxygen atoms. For example, $R^4$ can be methyl, ethyl, propyl, butyl, 2-ethylhexyl, octyl, decyl, phenylethyl, methoxyethyl, ethoxyethyl, butoxyethyl phenoxyethyl ethoxypropyl, methoxyethoxyethyl, ethoxyethoxyethyl, allyl, crotyl, and the like. Particularly preferred of the alkadiene ethers are the butadiene ethers.

The alkadiene ethers are quite reactive chemically, undergoing reactions typical of conjugated dienes, for instance, the Diels-Alder reactions. They are especially useful in polymerization reactions to produce polymeric oil-like products having properties of drying oils, lacquers, synthetic resins, and vulcanizable rubber-like products.

In carrying out our process, the aliphatic triether is heated in the presence of the acid-acting catalyst to a temperature sufficient to decompose the triether and vaporize the 1,3-alkadiene ether and the liberated alcohol. The vapor containing the alkadiene ether and liberated alcohol is removed from the reaction zone at a rate substantially as it is formed. The alkadiene ether can be recovered from the distillate by condensing the vapors and separating the components.

We have found the optimum decomposition temperature of the triether to be at or near the boiling point of the triether at the operating pressure. The boiling point of the alkadiene ether and the liberated alcohol will be near or below the boiling point of the triether so that these products will be vaporized at the decomposition temperature. The process is preferably conducted by heating the aliphatic triether to boiling and removing the alkadiene ether and the alcohol as they are formed. The process is best carried out in a reactor provided with a fractionating column so that the reaction mixture in this dealcoholation reaction is partially rectified to permit only the alkadiene ether and alcohol to be removed overhead, while returning the unreacted triether and partially dealcoholated products back to the reactor. However, if desired, the process can be conducted so that a portion of the aliphatic triether and any partially dealcoholated products are removed with the alkadiene ether and alcohol vapors, and subsequently separated and the triether and partially dealcoholated products returned to the reactor or used elsewhere. It is believed that this dealcoholation occurs stepwise, with first one alcohol equivalent splitting from the triether to form one or more of the possible alkenyl diethers and then a second alcohol equivalent splitting off to form the 1,3-alkadiene ether.

The reaction temperature for this dealcoholation is not narrowly critical. Since the dealcoholation is preferably conducted at or near the boiling point of the triether, and the various triethers can vary considerably in boiling point, no specific limits of temperature can be set. The boiling point of course is also dependent upon the operating pressure. Generally temperatures within the range of about 70° C. to about 250° C. have been found to be suitable. We prefer, however, temperatures within the range of about 100° C. to about 200° C., for best operation. The rate of dealcoholation is in direct relation with the temperature and the catalyst concentration, with the rate of dealcoholation preferably selected according to the heating capacity of the still and distillation capacity of the fractionating column.

Atmospheric, subatmospheric, and superatmospheric pressures can be employed in this process, with the pressure having a direct effect on the dealcoholation temperature or boiling temperature of the triether. The combination of temperature and pressure affects the removal of the alkadiene ether and alcohol. Thus the reaction can be carried out at any preferred temperature to obtain the desired rate of reaction with the pressure adjusted accordingly, so that the triether will be at or near its boiling point, and the alkadiene ether and the alcohol can be removed substantially at the rate at which they are formed.

When the alkadiene ether normally has a high boiling point, the system is preferably operated under reduced pressure so that both the ether and the alcohol can be removed as vapors. For low boiling alkadiene ethers and alcohols, atmospheric or superatmospheric pressures can be employed. The alkadiene ethers and the alcohols will always have lower boiling points than the starting triether. Thus, for any particular triether, the preferred operating pressure is that pressure equal to or near the vapor pressure of the triether at the desired reaction temperature.

If the temperature and pressure of the system are maintained such that the rate of dealcoholation exceeds the distillation capacity of the still, the 1,3-alkadiene ether will accumulate in the still kettle, and polymerization is likely to occur. These unsaturated ethers will polymerize quite easily under acidic conditions such as exist in the reactor. Thus when such polymerization occurs, yield of the monomeric ether is low and the reaction becomes difficult. By removing the ether at a rate substantially as it is formed, polymerization does not occur and yields up to nearly 100 percent of the alkadiene ether are possible.

The acid-acting catalysts which may be employed in the practice of this invention include mineral acids, strong organic acids, acid acting salts, and activated earths. It is essential that the catalysts be substantially non-volatile at the reaction temperatures employed. For example, strong acids such as phosphoric acid, sulphuric acid, toluene sulfonic acid, and benzene sulfonic acid and such acid acting salts as zinc chloride, cupric sulphate, copper phosphate, aluminum chloride, and the acid-acting activated clays can be employed. Phosphoric acid is preferred, and when used in amounts of about 0.05 part to about 0.50 part per 100 parts of reaction mixture, provides particularly good yields of the 1,3-alkadiene ether. According to our experience, the strong acid catalysts are more effective than the acid-acting salts and activated clays, and are generally preferred. The catalysts can be employed in amounts from about 0.001 to about 5.0 parts by weight of the reaction mixture, with amounts of about 0.01 to about 1.0 part being preferred.

It is advantageous, but not essential in our process that when phosphoric acid is used, that it be added slowly to the triether in the reaction vessel in an inert solvent, in a dilute solution with the triether, or in solution with the same alcohol as formed in the dealcoholation. During the addition, the triether in the kettle is maintained at a temperature at or near the boiling point of the reaction mixture. The addition of the dilute acid solution is continued until the desired concentration of acid in the kettle is obtained.

With highly reactive alkadiene ethers, for instance 1-allyloxy-1,3-butadiene, a less active catalyst, such as an acid-acting salt like cupric phosphate, or an activated earth can provide milder conditions desirable in preventing polymerization of the alkadiene ether as it is formed. These less active catalysts can be added either before or during the heating of the triether.

The alkadiene ethers, we have found, easily recondense with the liberated alcohol and will also polymerize. To prevent such results, the distillate of the dealcoholation can be inhibited from reacting further by the addition of an alkaline material, for instance inorganic and organic alkaline compounds, for example, an alkaline inhibitor such as hydroxides, carbonates, and alcoholates of sodium and potassium, and quaternary ammonium compounds, such as tetramethylammonium hydroxide and high boiling amines as di(2-ethylhexyl)amine, triethanolamine, phenylethanolamine, and the like.

An antioxidant such as butyl-p-aminophenol, hydroquinone, isobutyl p-aminophenol or methylene blue can also be advantageously employed in addition to the alkaline material. We prefer that the inhibitor and the antioxidant be used in amounts of about 0.01 to about 1.0 part per 100 parts of the distillate.

The alkadiene ether-alcohol distillate is easily separated into its respective components by known means, for instance by extraction or by distillation. Where the dealcoholation involves water miscible alcohols such as methanol, ethanol, ethoxyethanol, ethoxyethoxyethanol, propanol, isopropanol, and allyl alcohol, extraction of the distillate with water effectively removes the alcohol. The water for extraction is preferably made basic with a small amount of sodium hydroxide or other water-soluble alkaline material to prevent hydrolysis or acid-catalyzed polymerization of the alkadiene ether. In many cases the alcohol can also be removed by distillation.

With higher alcohols such as decanol, phenoxyethanol, 2-ethylhexanol, and other water-insoluble alcohols, vacuum distillation or solvent extraction methods are preferred. In such distillation operations, an alkaline inhibitor and an antioxidant should preferably be present both in the feed mixture and the refined alkadiene ether to prevent polymerization.

Continuous operation of the dealcoholation reaction is preferred, with the aliphatic triether being added at a rate such that the alkadiene ether and alcohol are removed as rapidly as they are formed, with nearly a constant volume being maintained in the reaction kettle. For operation over long periods of time, it is desirable to periodically or continuously remove a small portion of the kettle contents to prevent the accumulation in the kettle of a high concentration of high boiling materials and to add additional amounts of catalyst as needed to maintain the desired rate of reaction. In this way our process can be operated continuously over long periods. However, if desired, the process can be operated in a semi-continuous manner without addition of more catalyst or removal of high boiling products from the still kettle.

The acidic catalysts have a relatively long life in our liquid-phase process. While in some cases, a slow consumption of the catalyst does occur, the rate of consumption is extremely low. In our experience, a loss of catalyst activity of less than 2 percent (of the 0.13 percent of phosphoric acid in the kettle charge) per hour at a production rate of about 40 percent of the kettle charge per hour has been achieved in the dealcoholation of 1,1,3-trimethoxybutane over a 13 hour period. This represents a catalyst consumption of only about one pound of phosphoric acid per 17,000 pounds of 1,1,3-trimethoxybutane dealcoholated. Lower rates of catalyst consumption are to be expected in runs of greater duration.

The starting materials in our process, the aliphatic triethers, as represented by the general formula hereinbefore set forth, are known. They can be prepared by the reaction of an alpha-beta unsaturated aldehyde, for example crotonaldehyde, 2-hexenal, 2-octenal, 2-ethyl-2-hexenal, and 4-ethyl-2-octenal, with an aliphatic alcohol in the presence of an acid catalyst. They can also be prepared by the reaction of an acetal of a saturated aldehyde, for instance, acetaldehyde, propionaldehyde, butyraldehyde, hexaldehyde, decanal, and 2-ethylhexaldehyde with an alpha-beta unsaturated ether, such as vinyl ethyl ether, 1-propenyl ethyl ether, 1-hexenyl ethyl ether, and vinyl 2-ethylhexyl ether in the presence of boron trifluoride or other Friedel-Crafts type catalyst.

The following examples will serve to illustrate this invention. Examples 1 through 4 were conducted using a 1-liter still kettle equipped on top with a 41 mm. O.D. glass column 1220 mm. long packed with stainless steel sponge. The packed column was equipped with three thermowells for recording temperature at 410, 610, and 810 mm. from the bottom and designated as bottom column temperature, center column temperature, and top column temperature, respectively.

The top of the column had a vapor outlet equipped with a thermometer, and a water cooled condenser. Provision was made for removing condensed products and for returning a part of the condensate to the top of the column. The still kettle was heated by an electric heating mantle, and equipped with a means for controlling the introduction of the aliphatic triether and/or catalyst mixture. A thermometer recorded kettle temperatures.

Example 1

Four-hundred grams of 1,1,3-trimethoxybutane (98.2 percent purity) was charged into the still kettle and heated to boiling (157° C.) at atmospheric pressure. As soon as the lower column temperature reached 150° C., a solution containing 0.2 percent phosphoric acid in 1,1,3-trimethoxybutane was slowly added more or less continuously to the boiling liquid in the kettle at an average rate of about two ml. per minute. Demethanolation started as soon as the catalyst was added and progressively increased as the concentration of the catalyst increased. Methanol and 1-methoxy-1,3-butadiene vapors were removed overhead and condensed as they were formed.

The addition of the solution of phosphoric acid in 1,1,3-trimethoxybutane was continued for 250 minutes, at which time the acid concentration in the kettle amounted to 0.25 percent. At this point 1,1,3-trimethoxybutane containing no catalyst was substituted as the feed and continued at a rate to maintain a constant volume of liquid (approximately 500 ml.) in the kettle.

The rate of removal and reflux of the distillate were regulated to maintain a top column temperature of 100° C.±1° during the entire operation. The vapor temperature was maintained at 63° C.±1°, the center column temperature at 110° C.±1°, the bottom column temperature at 118° C.±2° C., and the kettle temperature at 150° C.±1°.

The distillate collected in the receiver was inhibited with di-(2-ethylhexyl) amine to prevent polymerization of the 1-methoxy-1,3-butadiene or recombination with the methanol. The di-(2-ethylhexyl) amine concentration was maintained at about 0.05 percent of the collected distillate. This distillate contained 54.2 percent of 1-methoxy-1,3-butadiene, representing a yield of 97 percent based on the 1,1,3-trimethoxybutane converted. The 1-methoxy-1,3-butadiene was recovered by extracting the distillate twice with an equal volume of water to remove methanol and then redistilling the washed material, the 1-methoxy-1,3-butadiene being collected at a vapor temperature of 50.5 to 52° C. at 190 mm. Hg pressure. The 1-methoxy-1,3-butadiene was 98.7 percent pure, having a boiling point of 90.9° C., at 760 mm. Hg, specific gravity (20/15.6° C.) of 0.8318, and a refractive index $n_D^{20}$ of 1.4642.

The reaction kettle at the end of the operation contained organic residue amounting to 0.84 percent by weight of the total 1,1,3-trimethoxybutane converted.

Example 2

Four hundred grams of 1,1,3-triethoxyhexane was charged into the still kettle, the pressure was reduced to 100 mm. Hg, and the charge was heated to boiling at 154° C. As soon as the vapors reached the bottom thermowell of the column, a solution containing 0.1 percent phosphoric acid in 1,1,3-triethoxyhexane was slowly added to the boiling liquid in the kettle at an average rate of about 5 ml. per minute. Deethanolation started as soon as the catalyst was added and increased as the catalyst concentration increased. Ethanol and 1-ethoxy-1,3-hexadiene vapors were removed overhead and condensed as they were formed.

The addition of the phosphoric acid and 1,1,3-triethoxyhexane mixture was continued for about 20 minutes until the acid concentration in the kettle amounted to about 0.03 percent, at which point 1,1,3-triethoxyhexane containing no catalyst was substituted as the feed, and continued at a rate to maintain a constant volume of liquid (approximately 500 ml.) in the kettle. Periodically the feed of 1,1,3-triethoxyhexane was interrupted to add small amounts of the dilute catalyst solution. A total of 0.4 gram of phosphoric acid (0.1 percent of the reaction mixture in the kettle) was added throughout the entire reaction of 5.5 hours' duration.

The rate of removal of the distillate and reflux were regulated to maintain a vapor temperature of 65° C. to 70° C., a top column temperature of 113° C. to 114° C., a center column temperature of 117° C. to 120° C., a bottom column temperature of 125° C. to 126° C., and a kettle temperature of 147° C. to 148° C.

The distillate was collected as in Example 1, using di-(2-ethylhexyl) amine as the inhibitor. The distillate contained 54.2 percent of 1-ethoxy-1,3-hexadiene which represented a yield of 93 percent based on the 1,1,3-triethoxyhexane converted. The distilate was redistilled under vacuum to separate the 1-ethoxy-1,3-hexadiene and ethanol.

The refined 1-ethoxy-1,3-hexadiene thus produced had the following physical properties: boiling point, 100° C. at 100 mm. Hg and 52° C. at 10 mm. Hg; specific gravity, (20/15.6° C.) of 0.829; refractive index, $n_D^{20}$ of 1.4713.

Example 3

One hundred grams of 1,1,3-triallyloxybutane and five grams of powdered copper phosphate as a catalyst were charged to the still kettle and heated to boiling at 182° C. at atmospheric pressure. Dealcoholation proceeded slowly at a kettle temperature of 182° C. to 195° C. An additional 92 grams of 1,1,3-triallyloxybutane was added gradually during a period of 2.5 hours to maintain a constant volume in the kettle. Distillate was removed at a vapor temperature of 77° C. to 95° C., while the top and bottom column temperatures were 92° C. to 96° C., and 93° C to 98° C., respectively, and the kettle temperature was 182° C. to 195° C. The collected distillate was inhibited with hydroquinone added so as to maintain about a 0.1 percent concentration in the distillate.

The distillate was distilled under vacuum and a fraction was obtained at 68 C. and 30 mm. Hg pressure containing 1-allyloxy-1,3-butadiene in a yield of 22 percent based on the 1,1,3-triallyloxybutane converted. This fraction had a specific gravity 27/20° C. of 0.8847; a refractive index $n_D^{20}$ of 1.4687; and molecular refractivity of 34.43. The calculated molecular refractivity of 1-allyloxy-1,3-butadiene is 34.76. The 1-allyloxy-1,3-butadiene is believed to partially isomerize to 2-vinyl-4-pentenal.

Eample 4

Four hundred grams of 1,1,3-tri(2-methoxyethoxy) butane was charged into the still kettle and heated to boiling at 182° C. while the pressure was maintained at 5 mm. Hg. When the vapors reached the bottom thermowell and the temperature at that point reached 150° C. with a kettle temperature of 182° C., a solution containing 0.2 percent phosphoric acid in 1,1,3-tri(2-methoxyethoxy) butane was added at a rate of about 3 ml. per minute. Dealcoholation started as soon as the catalyst was added and increased as the catalyst concentration in the kettle increased. During the dealcoholation, overhead vapors were condensed as they were formed and part of the distillate refluxed back to the column so that the temperatures of operation were maintained as follows: vapor temperature, 20° C. to 40° C.; top column temperature, 48° C. to 56° C.; center column temperature, 52° C. to 58° C.; bottom column temperature, 54° C. to 60° C.; and kettle temperature 124° C. to 148° C.

The addition of the catalyst solution was continued until the concentration of the phosphoric acid in the kettle amounted to 0.1 percent of the kettle contents. At this point 1,1,3-tri-(2-methoxyethoxy) butane containing no catalyst was substituted as the feed to maintain a constant volume of liquid (approximately 500 ml.) in the kettle. During the operation, 0.2 gram of additional phosphoric acid (0.05 percent of the reaction mixture) was added to the kettle, as a dilute solution in 1,1,3-tri-(2-methoxyethoxy) butane.

The 2-methoxyethanol and 1-(2-methoxyethoxy)-1,3 butadiene in the distillate were separated by distillation under vacuum, securing a yield of 1-(2-methoxyethoxy)-1,3-butadiene of 78.6 percent. The 1-(2-methoxyethoxy)-1,3-butadiene had a purity of 99.5 percent and the following physical properties: boiling point, 41° C. at 3 mm. Hg, 48° C. at 5 mm. Hg, and 60° C. at 10 mm. Hg; specific gravity (20/15.6° C.) of 0.9185, and a refractive index $n_D^{20}$ of 1.4740.

Example 5

1,1,-trimethoxy-2-ethylbutane (200 grams) was charged into a 500 ml. kettle attached to a 20 by 380 mm. glass still column packed with stainless steel sponge. The pressure in the still was reduced to 300 mm. of mercury and the 1,1,3-trimethoxy-2-ethylbutane was heated to boiling (152° C.). As soon as the vapors had risen about half the distance up the column, a 0.1 percent solution of phosphoric acid in 1,1,3-trimethoxy-2-ethylbutane was added to the boiling liquid in the kettle at a rate of about 60 ml. per hour. Methanol and 1-methoxy-2-ethyl-1,3-butadiene were removed as the distillate and condensed as rapidly as they were formed. The addition of the catalyst solution was continued for 2.0 hours at which time the concentration of phosphoric acid in the kettle liquid amounted to 0.06 percent. At this point 1,1,3-trimethoxy-2-ethylbutane containing no catalyst was substituted as the feed to maintain a constant volume of approximately 200 ml. of liquid in the kettle and this was continued for a period of 2.6 hours. After the feed of 1,1,3-trimethoxy-2-ethylbutane was terminated, the reaction was stopped by adding a solution of 0.5 gram of sodium methoxide in 10 grams of methanol to the kettle to neutralize the catalyst, after which the distillation was continued to recover the unreacted 1,1,3-trimethoxy-2-ethylbutane as a separate fraction. During the operation a total of 200 grams of 1,1,3-trimethoxy-2-ethylbutane was added in addition to the original charge, for a total amount used of 400 grams.

The rate of removal of distillate was regulated to maintain a kettle temperature near to the boiling point of the 1,1,3-trimethoxy-2-ethylbutane (152° C. at 300 mm. Hg) and the vapor temperature was 56° C. to 81° C.

The distillate collected during the demethanolation operation was inhibited with 0.05 percent of di-(2-ethylhexyl) amine. This distillate amounted to 208 grams and contained 63.3 weight percent of 1-methoxy-2-ethyl-1,3-butadiene, which represented a yield of 99 percent, based on the triether converted during continuous operation. The distillate collected after neutralization of the acid catalyst amounted to 187.5 grams and contained 4.7 percent of 1-methoxy-2-ethyl-1,3-butadiene, 5.9 percent of dimethoxy-2-ethylbutenes, and 81.6 percent of 1,1,3-trimethoxy-2-ethylbutane. The overall yield of 1-methoxy-2-ethyl-1,3-butadiene was 55 percent and the yield of the intermediate dimethoxy-2-ethylbutenes was 3.4 percent. The overall efficiency to both products was 96 percent.

The 1-methoxy-2-ethyl-1,3-butadiene was purified by a fractional distillation of the crude product. The refined material had the following properties: Purity, 99.9 percent; boiling point 72° C./100 mm. Hg; specific gravity, (20/15.6° C.), 0.8375; refractive index $n_D^{20}$, 1.4730; λmax., 244 mu.; molecular extinction coefficient, 24,900. Elemental analysis: Theoretical, C=74.9 percent, H=10.9 percent; Found, C=74.8 percent, H=10.8 percent.

Example 6

1,1,3-triethoxy-4-ethyloctane (200 grams) was charged to the same equipment described in Example 5. The pressure in the still was reduced to 20 mm. of mercury and the 1,1,3-triethoxy-4-ethyloctane was heated to boiling (154° C.). As soon as the vapors had risen about half the distance up the column, a 0.2 percent solution of phosphoric acid in 1,1,3-triethoxy-4-ethyloctane was added to the boiling liquid in the kettle at a rate of about 80 ml. per hour. Ethanol and 1-ethoxy-4-ethyl-1,3-octadiene were removed as the distillate. The addition of the catalyst solution was continued for one-half hour at which time the concentration of phosphoric acid in the kettle was 0.04 percent. At this point 1,1,3-triethoxy-4-ethyloctane containing no acid was substituted as the feed to maintain a constant volume of about 200 ml. of liquid in the kettle and this was continued for 35 minutes. After the feed of 1,1,3-triethoxy-4-ethyloctane was stopped, the distillation was continued without neutralizing the catalyst until the material in the kettle was exhausted. The entire operation was carried out in three hours and a total of 159 grams of 1,1,3-triethoxy-4-ethyloctane was added in addition to the original charge, for a total amount used of 359 grams.

During the period when 1,1,3-triethoxy-4-ethyloctane was being fed to the kettle the vapor temperature ranged from 49° C. to 99° C. and the kettle temperature varied from 130° C. to 154° C. Higher temperatures, up to 120° C. vapor temperature and 192° C. kettle temperature were experienced during the final stages when the material in the kettle was being exhausted. The distillate was inhibited with 0.05 percent of di-(2-ethylhexyl) amine.

The distillate amounted to 300 grams and contained 57.2 percent of 1-ethoxy-4-ethyl-1,3-octadiene. The yield was 72 percent of theoretical. There was 57 grams of liquid residue remaining in the kettle.

The 1-ethoxy-4-ethyl-1,3-octadiene was purified by distillation of the crude product. The refined product had the following properties: boiling point, 67° C./1 mm. Hg; specific gravity (20/15.6° C.), 0.841; refractive index $n_D^{20}$, 1.4788; λmax., 245 mu.; molecular extinction coefficient, 25,000. Elemental analysis: Theoretical C=79.1 percent, H=12.2 percent; Found, C=78.8 percent, H=12.2 percent.

Example 7

1,1,3 - tri-ethylhexoxy)butane (150 grams) was charged to the same equipment described in Example 5. The pressure in the still was reduced to about 1 mm. of mercury and the 1,1,3-tri-(2-ethylhexoxy)butane was heated to boiling (182° C.). As soon as the vapors had risen about half the distance up the column, a solution of about 0.1 percent of phosphoric acid in 1,1,3-tri-(2-ethylhexoxy)butane was added to the boiling liquid in the kettle at a rate of about 35 ml. per hour. 2-Ethylhexanol and 1-(2-ethylhexoxy)-1,3-butadiene were removed as the distillate as rapidly as they were formed. The addition of the acid solution was continued for 17 minutes, at which time the concentration of phosphoric acid in the kettle liquid amounted to 0.01 percent. At this point, 1,1,3-tri-(2-ethylhexoxy)butane containing no catalyst was substituted as the feed to maintain a constant volume of approximately 150 ml. of liquid in the kettle. The feed of 1,1,3-tri-(2-ethylhexoxy)butane was continued for 75 minutes with an interruption for the addition of 0.01 percent more of catalyst added to the kettle, again as a 0.1 percent solution in the acetal. The distillation was continued without neutralizing the catalyst, after the feed of 1,1,3-tri-(2-ethylhexoxy)butane was stopped, in order to exhaust the material remaining in the kettle. Four hours were required to complete the entire operation and a total of 93 grams of 1,1,3-tri-(2-ethylhexoxy)butane was added in addition to the original charge, for a total amount used of 243 grams.

The rate of removal of distillate was regulated to maintain a vapor temperature of 44° C. to 54° C. and a kettle temperature of 177° C. to 207° C. The distillate was inhibited with 0.05 percent of di-(2-ethylhexyl) amine.

The distillate amounted to 228 grams and contained 38.7 percent of 1-(2-ethylhexoxy)-1,3-butadiene. The yield of 1-(2-ethylhexoxy)-1,3-butadiene was 88 percent of theoretical. Refined 1-(2-ethylhexoxy)-1,3-butadiene was obtained by distillation of the crude product. The refined product had the following properties: boiling point 61.5° C./1 mm. Hg; specific gravity (20/15.6° C.), 0.835; refractive index $n_D^{20}$, 1.4675; λmax., 238 mu.; molecular extinction coefficient, 24,550. Elemental analysis: Theoretical, C=79.1 percent; H=12.2 percent; Found C=79.0 percent, H=12.2 percent.

*Example 8*

1,1,3-triethoxyhexane (400 grams) was charged to the same equipment used for Examples 1 to 4. The pressure in the still was reduced to 100 mm. of mercury and the 1,1,3-triethoxyhexane was heated to boiling. As soon as the vapors reached the still head, 50 ml. of 1,1,3-triethoxyhexane, to which had been added one ml. of a catalyst solution prepared from 1 gram of p-toluenesulfonic acid dissolved in 100 ml. of 1,1,3-triethoxyhexane, was fed slowly into the boiling liquid in the kettle. Deethanolation of the 1,1,3-triethoxyhexane started as soon as the feed of this catalyst solution was started and the rate increased as the catalyst concentration increased. The vapors of ethanol and 1-ethoxy-1,3-hexadiene were removed overhead and condensed as they were formed. Some of the intermediate diethoxyhexenes were also distilled over.

The addition of the catalyst solution was completed in about 19 minutes, at which time the concentration of p-toluene sulfonic acid in the kettle amounted to about 0.003 percent by weight. At this point 1,1,3-triethoxyhexane containing no catalyst was substituted as the feed, and this feed was continued at a rate to maintain a constant volume of liquid (approximately 500 ml.) in the kettle. Periodically, the feed of 1,1,3-triethoxyhexane was interrupted to add additional increments of catalyst, again as a dilute solution in 1,1,3-triethoxyhexane as described above. A total of 0.21 gram of p-toluenesulfonic acid (0.05 percent by weight of kettle liquid) was added throughout the entire reaction which lasted 6.3 hours. A total of 628 grams of 1,1,3-triethoxyhexane was fed including that contained in the catalyst solution. The total amount of 1,1,3-triethoxyhexane used was 1028 grams including the initial kettle charge.

The rate of removal of the distillate and the reflux ratio were regulated to maintain a vapor temperature of 65 to 109° C., a top column temperature of 104° C. to 122° C., a center column temperature of 108° C. to 127° C., and a kettle temperature of 134° C. to 150° C.

The distillate collected in the receiver was inhibited with about 0.4 percent of di(2-ethylhexyl) amine to prevent polymerization of the 1-ethoxy-1,3-hexadiene or recombination with the ethanol. The distillate (594 grams) contained 37.9 percent of 1-ethoxy-1,3-hexadiene and 18.7 percent of intermediate diethoxyhexenes.

At the end of the operation the catalyst has neutralized by adding 0.4 gram of 85 percent potassium hydroxide dissolved in 8 grams of ethanol to the kettle liquid. Then, the unconverted 1,1,3-triethoxyhexane was stripped from the kettle. This distillate (397 grams) contained 4.6 percent of 1-ethoxy-1,3-hexadiene, 2.8 percent of diethoxyhexenes, and 91.6 percent of 1,1,3-triethoxyhexane.

The yield of 1-ethoxy-1,3-hexadiene was 41 percent and the yield of diethoxyhexenes was 15.1 percent. The efficiency to both products was 86.9 percent. The residues in the kettle amounted to 23 grams.

We claim:

1. A process for producing a 1,3-alkadiene ether having the general formula

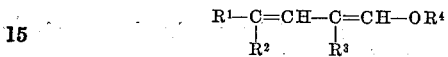

by the liquid-phase dealcoholation of an aliphatic triether having the general formula

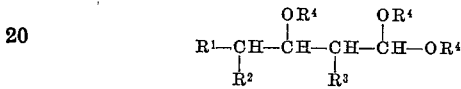

wherein $R^1$, $R^2$, and $R^3$ are members selected from the class consisting of hydrogen and lower alkyl groups, and $R^4$ is an aliphatic group containing from 1 to about 10 carbon atoms, which includes the steps of heating a solution of the said triether containing a catalytic amount of phosphoric acid dissolved therein to a temperature sufficient to decompose the triether and vaporize the 1,3-alkadiene ether, and removing the alkadiene ether vapors thus produced at a rate substantially as they are formed.

2. A process according to claim 1 wherein the alkadiene ether is a butadiene alkyl ether.

3. A process for producing a 1,3-alkadiene ether having the general formula

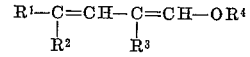

by the liquid phase dealcoholation of an aliphatic triether having the general formula

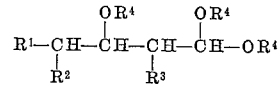

wherein $R^1$, $R^2$, and $R^3$ are members selected from the class consisting of hydrogen and lower alkyl groups, and $R^4$ is an aliphatic group containing from 1 to about 10 carbon atoms and no more than two oxygen atoms, the sum of the carbon atoms in groups $R^1$, $R^2$, $R^3$, and $R^4$ being less than 13, which includes the steps of heating a solution of the said triether containing phosphoric acid dissolved therein to a temperature sufficient to decompose the triether and vaporize the 1,3-alkadiene ether, said temperature being between about 70° C. and about 250° C., and said phosphoric acid being dissolved in the said triether in amounts from about 0.001 part to about 5.0 parts by weight per 100 parts of the said triether, removing the vapors thus produced as they are formed and condensing the alkadiene ether, the condensate being collected in the presence of a polymerization inhibitor.

4. A process according to claim 3 wherein the alkadiene ether is a butadiene alkyl ether.

5. A process for producing a 1,3-alkadiene ether having the general formula

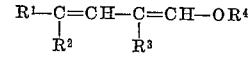

by the liquid phase dealcoholation of an aliphatic triether having the general formula

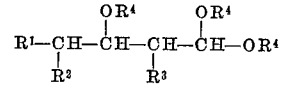

wherein $R^1$, $R^2$, and $R^3$ are members selected from the class consisting of hydrogen and lower alkyl groups and $R^4$ is an aliphatic group containing from 1 to about 10 carbon atoms and no more than two oxygen atoms, the sum of the carbon atoms in groups $R^1$, $R^2$, $R^3$, and $R^4$ being less than 13, which includes the steps of heating the said triether to a temperature about its boiling temperature, and slowly adding a dilute solution of phosphoric acid until between about 0.05 part and 0.50 part of acid per 100 parts by weight of the triether have been added, and after the addition of the said phosphoric acid, slowly adding more of the said triether to the reaction mixture at a rate substantially at its is consumed, while removing the alkadiene ether vapors thus produced at a rate substantially as they are formed, and recovering the alkadiene ether.

6. A process according to claim 5 wherein the alkadiene ether is a butadiene alkyl ether.

References Cited in the file of this patent

UNITED STATES PATENTS

| | | |
|---|---|---|
| 2,189,529 | Carothers et al. | Feb. 6, 1940 |
| 2,573,678 | Saunders | Nov. 6, 1951 |

FOREIGN PATENTS

| | | |
|---|---|---|
| 724,012 | Great Britain | Feb. 16, 1955 |

OTHER REFERENCES

Dykstra: Journal Amer. Chem. Soc., vol. 157, p. 2255–2259 (5 pgs.) (1935).

Norris et al.: Journal Amer. Chem. Soc., vol. 60, p. 1159–1161 (3 pgs.) (1938).